United States Patent
Deng et al.

(10) Patent No.: US 12,207,139 B2
(45) Date of Patent: Jan. 21, 2025

(54) PROCESSING METHOD OF DIRECT COMMUNICATION, PROCESSING DEVICE OF DIRECT COMMUNICATION, RELAY TERMINAL AND REMOTE TERMINAL

(71) Applicant: DATANG MOBILE COMMUNICATIONS EQUIPMENT CO., LTD., Beijing (CN)

(72) Inventors: Qiang Deng, Beijing (CN); Yunjing Hou, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 354 days.

(21) Appl. No.: 17/771,923

(22) PCT Filed: Sep. 1, 2020

(86) PCT No.: PCT/CN2020/112846
§ 371 (c)(1),
(2) Date: Apr. 26, 2022

(87) PCT Pub. No.: WO2021/082715
PCT Pub. Date: May 6, 2021

(65) Prior Publication Data
US 2022/0377617 A1    Nov. 24, 2022

(30) Foreign Application Priority Data
Oct. 30, 2019 (CN) .......................... 201911045315.7

(51) Int. Cl.
*H04W 28/24* (2009.01)
*H04W 28/02* (2009.01)
(Continued)

(52) U.S. Cl.
CPC ....... *H04W 28/24* (2013.01); *H04W 28/0268* (2013.01); *H04W 72/543* (2023.01); *H04W 28/10* (2013.01)

(58) Field of Classification Search
CPC ......... H04W 28/0268; H04W 28/0875; H04W 28/10; H04W 28/24; H04W 72/543;
(Continued)

(56) References Cited

U.S. PATENT DOCUMENTS

| 2008/0002608 A1 | 1/2008 | Zheng |
| 2020/0112873 A1 | 4/2020 | Zhu et al. |
| 2022/0286896 A1* | 9/2022 | Wang ................ H04W 28/0263 |

FOREIGN PATENT DOCUMENTS

| CN | 109005527 A | 12/2018 |
| CN | 110225547 A | 9/2019 |

(Continued)

OTHER PUBLICATIONS

The Extended European Search Report for European Patent Application No. 20881861.7 issued on Mar. 16, 2023.
(Continued)

*Primary Examiner* — Mansour Oveissi
(74) *Attorney, Agent, or Firm* — Ladas & Parry, LLP

(57) ABSTRACT

A processing method of direct communication, a processing device of direct communication, a relay terminal and a remote terminal are provided. The method includes: receiving a direct communication request message sent by a remote terminal, where the direct communication request message includes: a flow identification of a first QoS flow requested to be established and a QoS parameter of the first QoS flow; the first QoS flow is a QoS flow on a direct communication interface between the remote terminal and the relay terminal; and sending a direct communication response message to the remote terminal, where the direct
(Continued)

communication response message is configured to indicate that an establishment of the first QoS flow is finished.

16 Claims, 3 Drawing Sheets

(51) Int. Cl.
 *H04W 72/543* (2023.01)
 *H04W 28/10* (2009.01)

(58) Field of Classification Search
 CPC ..... H04W 76/14; H04W 76/23; H04W 88/04; H04W 92/18
 See application file for complete search history.

(56) References Cited

FOREIGN PATENT DOCUMENTS

| | | |
|---|---|---|
| EP | 3148285 A1 | 3/2017 |
| WO | 2019029824 A1 | 2/2019 |
| WO | 2019161269 A1 | 8/2019 |

OTHER PUBLICATIONS

"3rd Generation Partnership Project; Technical Specification Group Services and System Aspects; Architecture enhancements for 5G System (5GS) to support Vehicle-to-Everything (V2X) services (Release 16)," 3GPP TS 23.287 V16.0.0, Sep. 24, 2019, all pages.
International Search Report for PCT/CN2020/112846 issued on Nov. 27, 2020, and its English translation provided by WIPO.
Written Opinion for PCT/CN2020/112846, issued on Nov. 27, 2020, and its English translation provided by WIPO.
International Preliminary Report on Patentability for PCT/CN2020/112846, issued on May 3, 2022, and its English Translation provided by WIPO.
"QoS support for NR V2X," 3GPP TSG-RAN WG2 Meeting#106, R2-1906295, Reno, USA, May 13-17, 2019, Agenda item: 11.4.5, Source: Intel Corporation, all pages.

* cited by examiner

PROCESSING METHOD OF DIRECT COMMUNICATION, PROCESSING DEVICE OF DIRECT COMMUNICATION, RELAY TERMINAL AND REMOTE TERMINAL

CROSS-REFERENCE TO RELATED APPLICATIONS

The present application is the U.S. national phase of PCT Application PCT/CN2020/112846 filed on Sep. 1, 2020, which claims priority to Chinese patent application No. 201911045315.7, filed in China on Oct. 30, 2019, the entire contents of which are incorporated herein by reference.

TECHNICAL FIELD

The present disclosure relates to the field of communications technologies, and in particular, to a processing method of direct communication, a processing device of direct communication, a relay terminal and a remote terminal.

BACKGROUND

In the 4G system, the Proximity Services (ProSe) scheme includes: when the terminal is out of the network coverage range, the terminal cannot be directly connected with the network and can be connected with the network through the terminal with the relay function; a terminal out of the network coverage is called a Remote user equipment (Remote UE), and a terminal with a Relay function is called a Relay UE (Relay UE). For the communication between the remote user equipment and the network through the relay user equipment, the specific process is as follows:
1. the relay user equipment establishes a relay Packet Data Network (PDN) connection of a Uu interface;
2. the remote user equipment executes a discovery process to discover the relay user equipment;
3. the remote user equipment selects the relay user equipment and establishes direct connection one-to-one communication, and a communication interface between the remote user equipment and the relay user equipment is a PC5 interface. If a PDN connection needs to be newly established, the relay user equipment initiates a new PDN connection establishment process;
4. the relay user equipment allocates an IP address to the remote user equipment.

The remote user equipment communicates with the network through the PDN connection established by the relay user equipment.

In summary, the ProSe scheme in the 4G system is based on PDN connection granularity, that is, the PC5 connection between the remote UE and the relay UE and the Uu connection of the relay UE are both PDN connection granularity. The concept of Quality of Service (QoS) flow is introduced into the 5G system, and how to manage QoS flows of the PC5 interface and the Uu interface of the relay user equipment is a problem that is not solved at present.

SUMMARY

An object of the embodiments of the present disclosure is to provide a processing method of direct communication, a processing device of direct communication, a relay terminal and a remote terminal, so as to solve a problem that how to manage QoS flows of a direct communication interface and a Uu interface is not specified in the related art.

In order to solve the above problem, an embodiment of the present disclosure provides a processing method of direct communication, performed by a relay terminal and including:
receiving a direct communication request message sent by a remote terminal, where the direct communication request message includes: a flow identification of a first QoS flow requested to be established and a QoS parameter of the first QoS flow; the first QoS flow is a QoS flow on a direct communication interface between the remote terminal and the relay terminal; and
sending a direct communication response message to the remote terminal, where the direct communication response message is configured to indicate that an establishment of the first QoS flow is finished.

Optionally, the direct communication request message further includes:
a service information identification supported by the relay terminal.

Optionally, prior to the sending the direct communication response message to the remote terminal, the method further includes:
in a case that a PDU session corresponding to the service information identification supported by the relay terminal is not established on a Uu interface, establishing the PDU session corresponding to the service information identification supported by the relay terminal on the Uu interface, and establishing a third QoS flow meeting the QoS parameter of the first QoS flow on the established PDU session.

Optionally, prior to the sending the direct communication response message to the remote terminal, the method further includes:
in a case that a PDU session corresponding to the service information identification supported by the relay terminal is established on a Uu interface, judging whether a QoS flow on the established PDU session corresponding to the service information identification supported by the relay terminal is capable of meeting the QoS parameter of the first QoS flow;
the sending the direct communication response message to the remote terminal includes:
in a case that a second QoS flow capable of meeting the QoS parameter of the first QoS flow exists, sending the direct communication response message to the remote terminal;
in a case that no QoS flow capable of meeting the QoS parameter of the first QoS flow exists, establishing a fourth QoS flow meeting the QoS parameter of the first QoS flow on the Uu interface, and sending the direct communication response message to the remote terminal.

Optionally, the judging whether the QoS flow on the established PDU session corresponding to the service information identification supported by the relay terminal is capable of meeting the QoS parameter of the first QoS flow includes:
judging whether the QoS flow on the established PDU session is capable of meeting the QoS parameter of the first QoS flow, according to a mapping relation between a QoS parameter of the QoS flow on the direct communication interface and a QoS parameter of a QoS flow on the Uu interface configured by a network;
in a case that the QoS parameters of the QoS flows on the established Uu interface include a QoS parameter which has a mapping relation with the QoS parameter of the first QoS flow, determining that a second QoS flow capable of meeting the QoS parameter of the first QoS flow exists; otherwise, determined that the second QoS flow does not exist.

Optionally, prior to the sending the direct communication response message to the remote terminal, the method further includes:
storing a mapping relation between the flow identification of the first QoS flow and a flow identification of the third QoS flow.

Optionally, the method further includes:
sending, to the remote terminal, downlink data received from the third QoS flow on the Uu interface, through the first QoS flow on the direct communication interface according to the mapping relation.

Optionally, prior to the sending the direct communication response message to the remote terminal, the method further includes:
storing a mapping relationship between the flow identification of the first QoS flow and a flow identification of the second QoS flow; or
storing a mapping relationship between the flow identification of the first QoS flow and a flow identification of the fourth QoS flow.

Optionally, the method further includes:
sending, to the remote terminal, downlink data received from the second QoS flow or the fourth QoS flow on the Uu interface, through the first QoS flow on the direct communication interface according to the mapping relation.

Optionally, the method further includes:
sending a first registration request message to a network side device, where the first registration request message includes proximity service policy information that the relay terminal requests the network side device to provide;
receiving a first feedback message sent by the network side device, where the first feedback message includes the proximity service policy information, and the proximity service policy information includes: a mapping relationship between a QoS parameter of the QoS flow on the direct communication interface and a QoS parameter of a QoS flow on a Uu interface.

Optionally, the first registration request message further includes relay indication information, and the relay indication information is configured to indicate that a terminal which sends the first registration request message is a relay terminal.

Optionally, the direct communication response message includes: the service information identification supported by the relay terminal, the QoS parameter of the first QoS flow and the flow identification of the first QoS flow.

A processing method of direct communication is provided in an embodiment of the present disclosure, performed by a remote terminal and including:
sending a direct communication request message to a relay terminal, where the direct communication request message includes: a flow identification of a first QoS flow requested to be established and a QoS parameter of the first QoS flow; the first QoS flow is a QoS flow on a direct communication interface between the remote terminal and the relay terminal; and
receiving a direct communication response message sent by the relay terminal, where the direct communication response message is configured to indicate that an establishment of the first QoS flow is finished.

Optionally, the direct communication request message further includes:
a service information identification supported by the relay terminal.

Optionally, the direct communication response message includes: the service information identification supported by the relay terminal, the QoS parameter of the first QoS flow and the flow identification of the first QoS flow.

Optionally, the method further includes:
communicating with a network through the first QoS flow and the QoS flow established by the relay terminal.

Optionally, the method further includes:
sending a second registration request message to a network side device, where the second registration request message includes proximity service policy information of the relay terminal that the remote terminal requests the network side device to provide;
receiving a second feedback message sent by the network side device, where the second feedback message includes the proximity service policy information, and the proximity service policy information includes: service information identification supported by the relay terminal.

Optionally, the second registration request message includes remote indication information configured to indicate that a terminal sending the second registration request message is a remote terminal.

A processing device of direct communication is further provided in an embodiment of the present disclosure, performed by a relay terminal and including:
a first receiving module, configured to receive a direct communication request message sent by a remote terminal, where the direct communication request message includes: a flow identification of a first QoS flow requested to be established and a QoS parameter of the first QoS flow; the first QoS flow is a QoS flow on a direct communication interface between the remote terminal and the relay terminal;
a first responding module, configured to send a direct communication response message to the remote terminal, where the direct communication response message is configured to indicate that an establishment of the first QoS flow is finished.

A relay terminal is further provided in an embodiment of the present disclosure, including: a transceiver, a memory, a processor, and a computer program stored on the memory and executable on the processor; where the transceiver receives and transmits data under control of a processor, the processor is configured to read a program in a memory to perform:
receiving a direct communication request message sent by a remote terminal, where the direct communication request message includes: a flow identification of a first QoS flow requested to be established and a QoS parameter of the first QoS flow; the first QoS flow is a QoS flow on a direct communication interface between the remote terminal and the relay terminal; and
sending a direct communication response message to the remote terminal, where the direct communication response message is configured to indicate that an establishment of the first QoS flow is finished.

Optionally, the direct communication request message further includes:
a service information identification supported by the relay terminal.

Optionally, the processor is configured to read the program in memory to perform:
in a case that a PDU session corresponding to the service information identification supported by the relay terminal is not established on a Uu interface, establishing the PDU session corresponding to the service information identification supported by the relay terminal on the Uu interface, and establishing a third QoS flow meeting the QoS parameter of the first QoS flow on the established PDU session.

Optionally, the processor is configured to read the program in memory to perform:

in a case that a PDU session corresponding to the service information identification supported by the relay terminal is established on a Uu interface, judging whether a QoS flow on the established PDU session corresponding to the service information identification supported by the relay terminal is capable of meeting the QoS parameter of the first QoS flow;

in a case that a second QoS flow capable of meeting the QoS parameter of the first QoS flow exists, sending the direct communication response message to the remote terminal;

in a case that no QoS flow capable of meeting the QoS parameter of the first QoS flow exists, establishing a fourth QoS flow meeting the QoS parameter of the first QoS flow on the Uu interface, and sending the direct communication response message to the remote terminal.

A processing device of direct communication is further provided in the present disclosure, which is applied to a remote terminal, includes:

a request sending module, configured to send a direct communication request message to a relay terminal, where the direct communication request message includes: a flow identification of a first QoS flow requested to be established and a QoS parameter of the first QoS flow; the first QoS flow is a QoS flow on a direct communication interface between the remote terminal and the relay terminal;

a response receiving module, configured to receive a direct communication response message sent by the relay terminal, where the direct communication response message is configured to indicate that an establishment of the first QoS flow is finished.

A remote terminal is further provided in an embodiment of the present disclosure, including: a transceiver, a memory, a processor, and a computer program stored on the memory and executable on the processor; where the transceiver receives and transmits data under control of a processor, the processor is configured to read a program in a memory to perform:

sending a direct communication request message to a relay terminal, where the direct communication request message includes: a flow identification of a first QoS flow requested to be established and a QoS parameter of the first QoS flow; the first QoS flow is a QoS flow on a direct communication interface between the remote terminal and the relay terminal; and receiving a direct communication response message sent by the relay terminal, where the direct communication response message is configured to indicate that an establishment of the first QoS flow is finished.

Optionally, the direct communication request message further includes:

a service information identification supported by the relay terminal.

Optionally, the processor is configured to read a program stored in the memory to perform:

communicating with a network through the first QoS flow and the QoS flow established by the relay terminal.

A computer-readable storage medium is further provided in an embodiment of the present disclosure, where a computer program is stored on the computer-readable storage medium, the computer program is executed by a processor to perform the processing method of direct communication hereinabove.

The technical scheme of the present disclosure at least has the following beneficial effects:

according to the processing method of direct communication, the processing method of direct communication, the relay terminal and the remote terminal of the embodiment of the present disclosure, a first QoS flow on a direct communication interface between the relay terminal and the remote terminal is established, and the remote terminal communicates with a network through the first QoS flow and a QoS flow on a Uu interface of the relay terminal, so that the QoS flow between the relay terminal and the remote terminal is managed, so that the remote terminal can communicate through the PC5 QoS flow and the Uu QoS flow of the relay terminal.

DETAILED DESCRIPTION

To make the technical problems, technical solutions and advantages to be solved by the present disclosure clearer, the following detailed description is made with reference to the accompanying drawings and specific embodiments.

Figure 1:
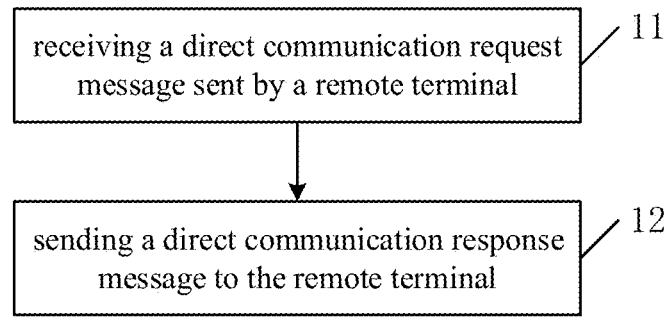
FIG. 1 is a flowchart of a processing method of direct communication performed by a relay terminal according to an embodiment of the present disclosure.

As shown in FIG. 1, an embodiment of the present disclosure further provides a processing method of direct communication, which is applied to a relay terminal, and includes:

Step 11: receiving a direct communication request message sent by a remote terminal, where the direct communication request message includes: a flow identification of a first QoS flow requested to be established and a QoS parameter of the first QoS flow; the first QoS flow is a QoS flow on a direct communication interface between the remote terminal and the relay terminal; and Step 12: sending a direct communication response message to the remote terminal, where the direct communication response message is configured to indicate that an establishment of the first QoS flow is finished.

In the embodiment of the disclosure, direct communication and a first QoS flow are established between a remote terminal and a relay terminal through a direct communication request message and a direct communication response message. Optionally, the direct communication interface is a PC5 interface, and the first QoS flow may be referred to as a PC5 QoS flow.

Optionally, the direct communication request message further includes:
- a service information identification (i.e., Relay Service Code) supported by the relay terminal; specifically, the service information identification which is of interest to the remote terminal and is supported by the relay terminal is carried in the direct communication request message.

Optionally, the direct communication response message includes: the service information identification supported by the relay terminal, the QoS parameter of the first QoS flow and the flow identification of the first QoS flow.

As an optional embodiment, before step 12, the method further includes:
- in a case that a PDU session corresponding to the service information identification supported by the relay terminal is not established on a Uu interface, establishing the PDU session corresponding to the service information identification supported by the relay terminal on the Uu interface, and establishing a third QoS flow meeting the QoS parameter of the first QoS flow on the established PDU session.

As a further optional embodiment, prior to Step 12, the method further includes:
- in a case that a PDU session corresponding to the service information identification supported by the relay terminal is established on a Uu interface, judging whether a QoS flow on the established PDU session corresponding to the service information identification supported by the relay terminal is capable of meeting the QoS parameter of the first QoS flow;

Step 12 further includes:
- in a case that a second QoS flow capable of meeting the QoS parameter of the first QoS flow exists, sending the direct communication response message to the remote terminal;
- in a case that no QoS flow capable of meeting the QoS parameter of the first QoS flow exists, establishing a fourth QoS flow meeting the QoS parameter of the first QoS flow on the Uu interface, and sending the direct communication response message to the remote terminal.

Correspondingly, before step 12, the method further includes:
- storing a mapping relation between the flow identification of the first QoS flow and a flow identification of the third QoS flow.

Further, the method further includes:
- sending, to the remote terminal, downlink data received from the third QoS flow on the Uu interface, through the first QoS flow on the direct communication interface according to the mapping relation.

Further, the judging whether the QoS flow on the established PDU session corresponding to the service information identification supported by the relay terminal is capable of meeting the QoS parameter of the first QoS flow includes:
- judging whether the QoS flow on the established PDU session is capable of meeting the QoS parameter of the first QoS flow, according to a mapping relation between a QoS parameter of the QoS flow on the direct communication interface and a QoS parameter of a QoS flow on the Uu interface configured by a network;
- in a case that the QoS parameters of the QoS flows on the established Uu interface include a QoS parameter which has a mapping relation with the QoS parameter of the first QoS flow, determining that a second QoS flow capable of meeting the QoS parameter of the first QoS flow exists; otherwise, determined that the second QoS flow does not exist.

Correspondingly, before step 12, the method further includes:
- storing a mapping relationship between the flow identification of the first QoS flow and a flow identification of the second QoS flow; or
- storing a mapping relationship between the flow identification of the first QoS flow and a flow identification of the fourth QoS flow.

Correspondingly, the method further includes the following steps:
- sending, to the remote terminal, downlink data received from the second QoS flow or the fourth QoS flow on the Uu interface, through the first QoS flow on the direct communication interface according to the mapping relation.

Figure 2:
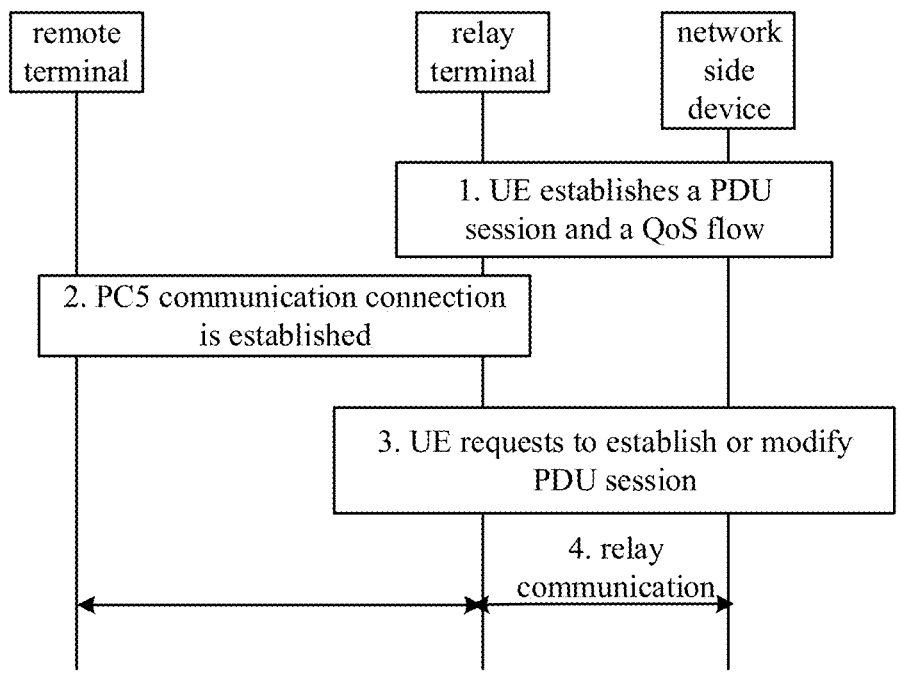
FIG. 2 is a schematic diagram illustrating a network configuring parameters for a relay terminal in a processing method of direct communication according to an embodiment of the present disclosure.

For example, as shown in FIG. 2, the flows of the relay terminal newly establishing or modifying a PDU session and newly establishing or modifying a QoS flow are as follows:

1. the relay terminal establishes a Protocol Data Unit (PDU) session and a QoS flow on a Uu interface.
2. PC5 communication connection is established between the remote terminal and the relay terminal.
3. If the relay terminal does not establish the PDU session corresponding to the relay Service Code requested by the remote terminal currently, the relay terminal initiates the establishment of the PDU session; if the relay terminal has established the PDU session corresponding to the relay Service Code requested by the remote terminal, but the current Uu QoS flow of the relay terminal cannot meet the requirement of the PC5 QoS flow of the remote terminal, the relay terminal initiates the PDU session modification process to newly establish the Uu QoS flow.
4. The remote terminal communicates through the PDU session and QoS flow of the relay terminal. For uplink data, the relay terminal sends data received from a PC5 QoS flow to a Uu QoS flow; for downlink data, the relay terminal sends the data received from the Uu QoS flow to the PC5 QoS flow through the mapping relationship (i.e., the mapping relationship between the PC5 QoS flow identification and the Uu QoS flow identification).

As another alternative, before step 11, the method further includes:
- sending a first registration request message to a network side device, where the first registration request message includes proximity service policy information that the relay terminal requests the network side device to provide;
- receiving a first feedback message sent by the network side device, where the first feedback message includes the proximity service policy information, and the proximity service policy information includes: a mapping relationship between a QoS parameter of the QoS flow on the direct communication interface and a QoS parameter of a QoS flow on a Uu interface.

The first registration request message further includes relay indication information, and the relay indication information is configured to indicate that a terminal which sends the first registration request message is a relay terminal.

Before the remote terminal and the relay terminal establish direct communication (i.e., the first QoS flow), the network needs to configure parameters to the relay terminal.

Figure 3:
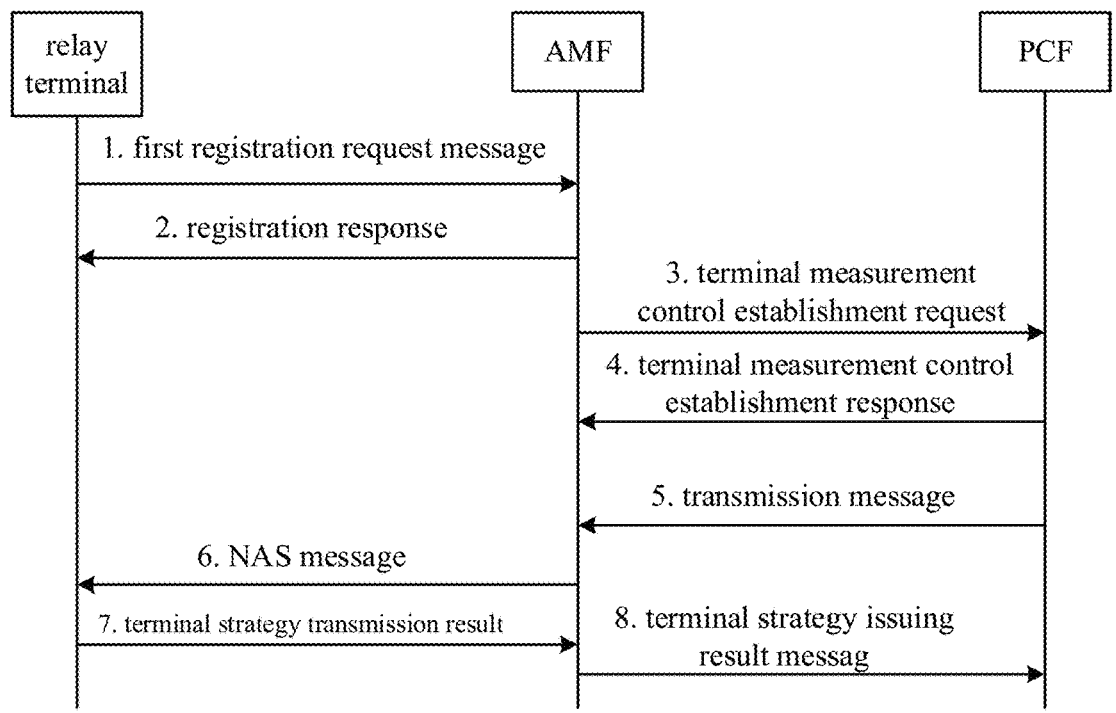
FIG. 3 is a schematic diagram illustrating a relay terminal establishing or modifying a PDU session in a processing method of direct communication according to an embodiment of the present disclosure.

For example, as shown in FIG. 3, the following is a flowchart of configuring parameters for a relay terminal by a network:

1. the relay terminal sends a first registration request message to an AMF (authentication management function entity), where the first registration request message contains terminal proximity service policy information and is configured to indicate to a PCF to request to provide proximity service ProSe policy information. The terminal indicates to the PCF that it is a relay terminal.

2. the AMF returns a registration response message to the terminal after finishing the registration process.

3. the AMF sends a terminal measurement control establishment request message to the PCF, and forwards the ProSe strategy request indication information and the relay terminal indication information to the PCF.

4. the PCF returns a terminal measurement control establishment response message to the AMF.

5. the PCF sends a transmission message to the AMF, where the transmission message contains a UE Policy Container and is used for providing the ProSe Policy information for the relay terminal, the ProSe Policy information includes a corresponding relation between a Uu QoS parameter and a PC5 QoS parameter, the Uu QoS parameter is a QoS parameter corresponding to a QoS flow established by the relay terminal on a Uu interface, and the PC5 QoS parameter is a QoS parameter corresponding to a QoS flow established by the relay terminal on a PC5 interface.

6. The AMF forwards the ProSe policy information to the relay terminal through a NAS (non-access stratum) message.

7. the relay terminal returns a terminal strategy transmission result to the AMF.

8. the AMF returns a terminal strategy issuing result message to the PCF.

In summary, according to the embodiment of the present disclosure, a first QoS flow on a direct communication interface between the relay terminal and the remote terminal is established, and the remote terminal communicates with a network through the first QoS flow and a QoS flow on a Uu interface of the relay terminal, so that the QoS flow between the relay terminal and the remote terminal is managed, so that the remote terminal can communicate through the PC5 QoS flow and the Uu QoS flow of the relay terminal.

Figure 4:
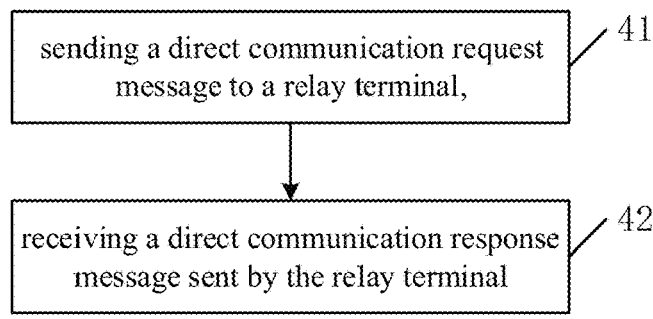
FIG. 4 is a flowchart of a processing method of direct communication performed by a remote terminal according to an embodiment of the present disclosure.

As shown in FIG. 4, an embodiment of the present disclosure further provides a processing method for direct communication, which is applied to a remote terminal, and includes:

Step 41: sending a direct communication request message to a relay terminal, where the direct communication request message includes: a flow identification of a first QoS flow requested to be established and a QoS parameter of the first QoS flow; the first QoS flow is a QoS flow on a direct communication interface between the remote terminal and the relay terminal;

Step 42: receiving a direct communication response message sent by the relay terminal, where the direct communication response message is configured to indicate that an establishment of the first QoS flow is finished.

In the embodiment of the disclosure, the direct communication and a first QoS flow are established between a remote terminal and a relay terminal through a direct communication request message and a direct communication response message. Optionally, the direct communication interface is a PC5 interface, and the first QoS flow may be referred to as a PC5 QoS flow.

Optionally, the direct communication request message further includes:
 a service information identification supported by the relay terminal. (i.e., Relay Service Code); specifically, the service information identification which is of interest to the remote terminal and is supported by the relay terminal is carried in the direct communication request message.

Optionally, the direct communication response message includes: the service information identification supported by the relay terminal, the QoS parameter of the first QoS flow and the flow identification of the first QoS flow.

As an optional embodiment, the method further includes:
 communicating with a network through the first QoS flow and the QoS flow established by the relay terminal.

For example, for uplink data, the relay terminal sends data received from the PC5 QoS flow to the Uu QoS flow; for downlink data, the relay terminal sends the data received from the Uu QoS flow to the PC5 QoS flow through the mapping relationship (i.e., the mapping relationship between the PC5 QoS flow identification and the Uu QoS flow identification).

As a further optional embodiment, before step 41, the method further includes:
 sending a second registration request message to a network side device, where the second registration request message includes proximity service policy information of the relay terminal that the remote terminal requests the network side device to provide;
 receiving a second feedback message sent by the network side device, where the second feedback message includes the proximity service policy information, and the proximity service policy information includes: service information identification supported by the relay terminal.

The second registration request message includes remote indication information configured to indicate that a terminal sending the second registration request message is a remote terminal.

Before the remote terminal and the relay terminal establish direct communication (i.e. a first QoS flow), the network needs to configure parameters to the remote terminal, so that the remote terminal obtains a service information identification supported by the relay terminal and obtains the terminal as the remote terminal.

In summary, according to the embodiment of the present disclosure, a first QoS flow on a direct communication interface between the relay terminal and the remote terminal is established, and the remote terminal communicates with a network through the first QoS flow and a QoS flow on a Uu interface of the relay terminal, so that the QoS flow between the relay terminal and the remote terminal is managed, so that the remote terminal can communicate through the PC5 QoS flow and the Uu QoS flow of the relay terminal.

Figure 5:
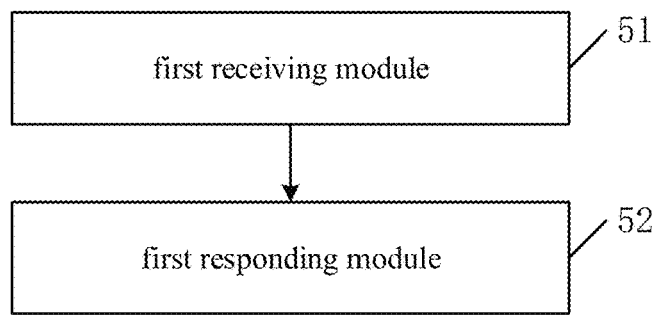
FIG. 5 is a schematic view of a processing device of direct communication applied to a relay terminal according to an embodiment of the present disclosure.

As shown in FIG. 5, an embodiment of the present disclosure further provides a processing device for direct communication, which is applied to a relay terminal, and includes:

a first receiving module 51, configured to receive a direct communication request message sent by a remote terminal, where the direct communication request message includes: a flow identification of a first QoS flow requested to be established and a QoS parameter of the first QoS flow; the first QoS flow is a QoS flow on a direct communication interface between the remote terminal and the relay terminal;

a first responding module 52, configured to send a direct communication response message to the remote terminal, where the direct communication response message is configured to indicate that an establishment of the first QoS flow is finished.

Optionally, in the above embodiment of the present disclosure, the direct communication request message further includes:

a service information identification supported by the relay terminal.

Optionally, in the above embodiment of the present disclosure, the device further includes:

the first establishing module is configured to, in a case that a PDU session corresponding to the service information identification supported by the relay terminal is not established on a Uu interface, establish the PDU session corresponding to the service information identification supported by the relay terminal on the Uu interface, and establishing a third QoS flow meeting the QoS parameter of the first QoS flow on the established PDU session.

Optionally, in the above embodiment of the present disclosure, the apparatus further includes:

a determining module, configured to, in a case that a PDU session corresponding to the service information identification supported by the relay terminal is established on a Uu interface, judge whether a QoS flow on the established PDU session corresponding to the service information identification supported by the relay terminal is capable of meeting the QoS parameter of the first QoS flow;

the first responding module includes:

a first sub-module, configured to, in a case that a second QoS flow capable of meeting the QoS parameter of the first QoS flow exists, send the direct communication response message to the remote terminal;

a second submodule, configured to, in a case that no QoS flow capable of meeting the QoS parameter of the first QoS flow exists, establish a fourth QoS flow meeting the QoS parameter of the first QoS flow on the Uu interface, and sending the direct communication response message to the remote terminal.

Optionally, in the above embodiment of the present disclosure, the determining module includes:

a third sub-module, configured to judge whether the QoS flow on the established PDU session is capable of meeting the QoS parameter of the first QoS flow, according to a mapping relation between a QoS parameter of the QoS flow on the direct communication interface and a QoS parameter of a QoS flow on the Uu interface configured by a network;

a fourth sub-module, configured to, in a case that the QoS parameters of the QoS flows on the established Uu interface include a QoS parameter which has a mapping relation with the QoS parameter of the first QoS flow, determine that a second QoS flow capable of meeting the QoS parameter of the first QoS flow exists; otherwise, determined that the second QoS flow does not exist.

Optionally, in the above embodiment of the present disclosure, the apparatus further includes:

a first storage module, configured to store a mapping relation between the flow identification of the first QoS flow and a flow identification of the third QoS flow.

Optionally, in the above embodiment of the present disclosure, the apparatus further includes:

a first transmission module, configured to send, to the remote terminal, downlink data received from the third QoS flow on the Uu interface, through the first QoS flow on the direct communication interface according to the mapping relation.

Optionally, in the above embodiment of the present disclosure, the apparatus further includes:

a second storage module, configured to store a mapping relationship between the flow identification of the first QoS; or store a mapping relationship between the flow identification of the first QoS flow and a flow identification of the fourth QoS flow.

Optionally, in the above embodiment of the present disclosure, the apparatus further includes:

a second transmission module, configured to send, to the remote terminal, downlink data received from the second QoS flow or the fourth QoS flow on the Uu interface, through the first QoS flow on the direct communication interface according to the mapping relation.

Optionally, in the above embodiment of the present disclosure, the apparatus further includes:

a first request module, configured to send a first registration request message to a network side device, where the first registration request message includes proximity service policy information that the relay terminal requests the network side device to provide;

a first feedback module, configured to receive a first feedback message sent by the network side device, where the first feedback message includes the proximity service policy information, and the proximity service policy information includes: a mapping relationship between a QoS parameter of the QoS flow on the direct communication interface and a QoS parameter of a QoS flow on a Uu interface.

Optionally, in the embodiment of the present disclosure, the first registration request message further includes relay indication information, and the relay indication information is configured to indicate that a terminal which sends the first registration request message is a relay terminal.

Optionally, in the above embodiment of the present disclosure, the direct communication response message includes: the service information identification supported by the relay terminal, the QoS parameter of the first QoS flow and the flow identification of the first QoS flow.

The embodiment of the present disclosure further provides a processing apparatus for direct communication, and as the principle of the apparatus for solving the problem is similar to the processing method for direct communication in the embodiment of the present disclosure, the implementation of the apparatus may refer to the implementation of the method, and the repetition points are not described again.

In summary, according to the embodiment of the present disclosure, a first QoS flow on a direct communication interface between the relay terminal and the remote terminal is established, and the remote terminal communicates with a network through the first QoS flow and a QoS flow on a Uu interface of the relay terminal, so that the QoS flow between the relay terminal and the remote terminal is managed, so that the remote terminal can communicate through the PC5 QoS flow and the Uu QoS flow of the relay terminal.

It should be noted that, the processing apparatus for direct communication provided in the embodiments of the present disclosure is an apparatus capable of executing the processing method for direct communication, and all embodiments of the processing method for direct communication are applicable to the apparatus and can achieve the same or similar beneficial effects.

Figure 6:
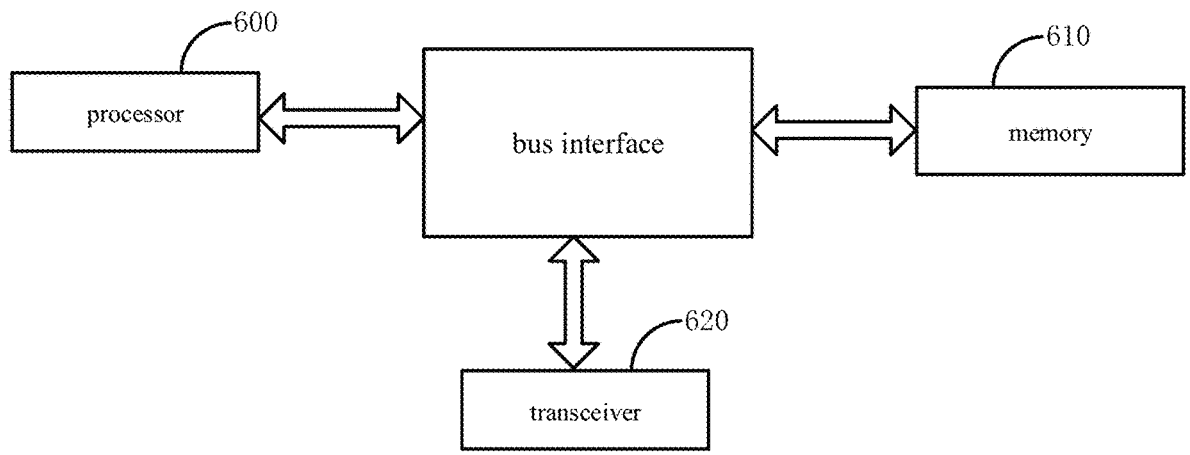
FIG. 6 is a schematic view of a relay terminal according to an embodiment of the present disclosure.

As shown in FIG. 6, an embodiment of the present disclosure further provides a relay terminal, including: a transceiver 620, a memory 610, a processor 600 and a computer program stored on the memory 610 and executable on the processor 600, the transceiver 620 receiving and transmitting data under the control of the processor 600, the processor 600 being configured to read the program in the memory to perform:

receiving a direct communication request message sent by a remote terminal, where the direct communication request message includes: a flow identification of a first QoS flow requested to be established and a QoS parameter of the first QoS flow; the first QoS flow is a QoS flow on a direct communication interface between the remote terminal and the relay terminal; and sending a direct communication response message to the remote terminal, where the direct communication response message is configured to indicate that an establishment of the first QoS flow is finished.

Optionally, the direct communication request message further includes:

a service information identification supported by the relay terminal.

Optionally, the processor 600 is configured to read a program in a memory to perform:

in a case that a PDU session corresponding to the service information identification supported by the relay terminal is not established on a Uu interface, establishing the PDU session corresponding to the service information identification supported by the relay terminal on the Uu interface, and establishing a third QoS flow meeting the QoS parameter of the first QoS flow on the established PDU session.

Optionally, the processor is configured to read a program in a memory to perform:

in a case that a PDU session corresponding to the service information identification supported by the relay terminal is established on a Uu interface, judging whether a QoS flow on the established PDU session corresponding to the service information identification supported by the relay terminal is capable of meeting the QoS parameter of the first QoS flow;

in a case that a second QoS flow capable of meeting the QoS parameter of the first QoS flow exists, sending the direct communication response message to the remote terminal;

in a case that no QoS flow capable of meeting the QoS parameter of the first QoS flow exists, establishing a fourth QoS flow meeting the QoS parameter of the first QoS flow on the Uu interface, and sending the direct communication response message to the remote terminal.

Optionally, the processor 600 is configured to read a program in a memory to perform:

judging whether the QoS flow on the established PDU session is capable of meeting the QoS parameter of the first QoS flow, according to a mapping relation between a QoS parameter of the QoS flow on the direct communication interface and a QoS parameter of a QoS flow on the Uu interface configured by a network;

in a case that the QoS parameters of the QoS flows on the established Uu interface include a QoS parameter which has a mapping relation with the QoS parameter of the first QoS flow, determining that a second QoS flow capable of meeting the QoS parameter of the first QoS flow exists; otherwise, determined that the second QoS flow does not exist.

Optionally, the processor 600 is configured to read a program in a memory to perform:

storing a mapping relation between the flow identification of the first QoS flow and a flow identification of the third QoS flow.

Optionally, the processor 600 is configured to read a program in a memory to perform:

sending, to the remote terminal, downlink data received from the third QoS flow on the Uu interface, through the first QoS flow on the direct communication interface according to the mapping relation.

Optionally, the processor 600 is configured to read a program in a memory to perform:

storing a mapping relationship between the flow identification of the first QoS flow and a flow identification of the second QoS flow; or storing a mapping relationship between the flow identification of the first QoS flow and a flow identification of the fourth QoS flow.

Optionally, the processor 600 is configured to read a program in a memory to perform:

sending, to the remote terminal, downlink data received from the second QoS flow or the fourth QoS flow on the Uu interface, through the first QoS flow on the direct communication interface according to the mapping relation.

Optionally, the processor 600 is configured to read a program in a memory to perform:

sending a first registration request message to a network side device, where the first registration request message includes proximity service policy information that the relay terminal requests the network side device to provide;

receiving a first feedback message sent by the network side device, where the first feedback message includes the proximity service policy information, and the proximity service policy information includes: a mapping relationship between a QoS parameter of the QoS flow on the direct communication interface and a QoS parameter of a QoS flow on a Uu interface.

Optionally, the first registration request message further includes relay indication information, and the relay indication information is configured to indicate that a terminal which sends the first registration request message is a relay terminal.

Optionally, the direct communication response message includes: the service information identification supported by the relay terminal, the QoS parameter of the first QoS flow and the flow identification of the first QoS flow.

The embodiment of the present disclosure further provides a relay terminal, and because the principle of solving the problem of the relay terminal is similar to the processing method of direct communication in the embodiment of the present disclosure, the implementation of the relay terminal may refer to the implementation of the method, and the repeated parts are not described again.

In summary, according to the embodiment of the present disclosure, a first QoS flow on a direct communication interface between the relay terminal and the remote terminal is established, and the remote terminal communicates with a network through the first QoS flow and a QoS flow on a Uu interface of the relay terminal, so that the QoS flow between the relay terminal and the remote terminal is managed, so that the remote terminal can communicate through the PC5 QoS flow and the Uu QoS flow of the relay terminal.

It should be noted that, the relay terminal provided in the embodiments of the present disclosure is a relay terminal capable of executing the processing method of direct communication, and all embodiments of the processing method of direct communication are applicable to the relay terminal, and can achieve the same or similar beneficial effects.

An embodiment of the present disclosure further provides a computer-readable storage medium, where a computer program is stored on the computer-readable storage medium, and when the computer program is executed by a processor, the computer program implements the processes of the foregoing embodiments of the processing method applied to direct communication of a relay terminal, and can achieve the same technical effects, and in order to avoid repetition, details are not repeated here. The computer-readable storage medium may be a Read-Only Memory (ROM), a Random Access Memory (RAM), a magnetic disk or an optical disk.

Figure 7:
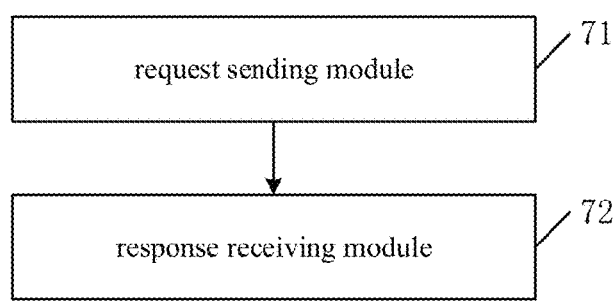
FIG. 7 is a schematic view of a processing device of direct communication applied to a remote terminal according to an embodiment of the present disclosure.

As shown in FIG. 7, an embodiment of the present disclosure further provides a processing apparatus for direct communication, which is applied to a remote terminal, and includes:

a request sending module 71, configured to send a direct communication request message to a relay terminal, where the direct communication request message includes: a flow identification of a first QoS flow requested to be established and a QoS parameter of the first QoS flow; the first QoS flow is a QoS flow on a direct communication interface between the remote terminal and the relay terminal;

a response receiving module 72, configured to receive a direct communication response message sent by the relay terminal, where the direct communication response message is configured to indicate that an establishment of the first QoS flow is finished.

Optionally, in the above embodiment of the present disclosure, the direct communication request message further includes:

a service information identification supported by the relay terminal.

Optionally, in the above embodiment of the present disclosure, the direct communication response message includes: the service information identification supported by the relay terminal, the QoS parameter of the first QoS flow and the flow identification of the first QoS flow.

Optionally, in the above embodiment of the present disclosure, the device further includes:

a communication module configured to communicate with a network through the first QoS flow and the QoS flow established by the relay terminal.

Optionally, in the above embodiment of the present disclosure, the apparatus further includes:

a second request module, configured to send a second registration request message to a network side device, where the second registration request message includes proximity service policy information of the relay terminal that the remote terminal requests the network side device to provide;

a second feedback module, configured to receive a second feedback message sent by the network side device, where the second feedback message includes the proximity service policy information, and the proximity service policy information includes: service information identification supported by the relay terminal.

Optionally, in the above embodiment of the present disclosure, the second registration request message includes remote indication information, where the remote indication information is configured to indicate that a terminal sending the second registration request message is a remote terminal.

The embodiment of the present disclosure further provides a processing apparatus for direct communication, and as the principle of the apparatus for solving the problem is similar to the processing method for direct communication in the embodiment of the present disclosure, the implementation of the apparatus may refer to the implementation of the method, and the repetition points are not described again.

In summary, according to the embodiment of the present disclosure, a first QoS flow on a direct communication interface between the relay terminal and the remote terminal is established, and the remote terminal communicates with a network through the first QoS flow and a QoS flow on a Uu interface of the relay terminal, so that the QoS flow between the relay terminal and the remote terminal is managed, so that the remote terminal can communicate through the PC5 QoS flow and the Uu QoS flow of the relay terminal.

It should be noted that, the processing apparatus for direct communication provided in the embodiments of the present disclosure is an apparatus capable of executing the processing method for direct communication, and all embodiments of the processing method for direct communication are applicable to the apparatus and can achieve the same or similar beneficial effects.

Figure 8:
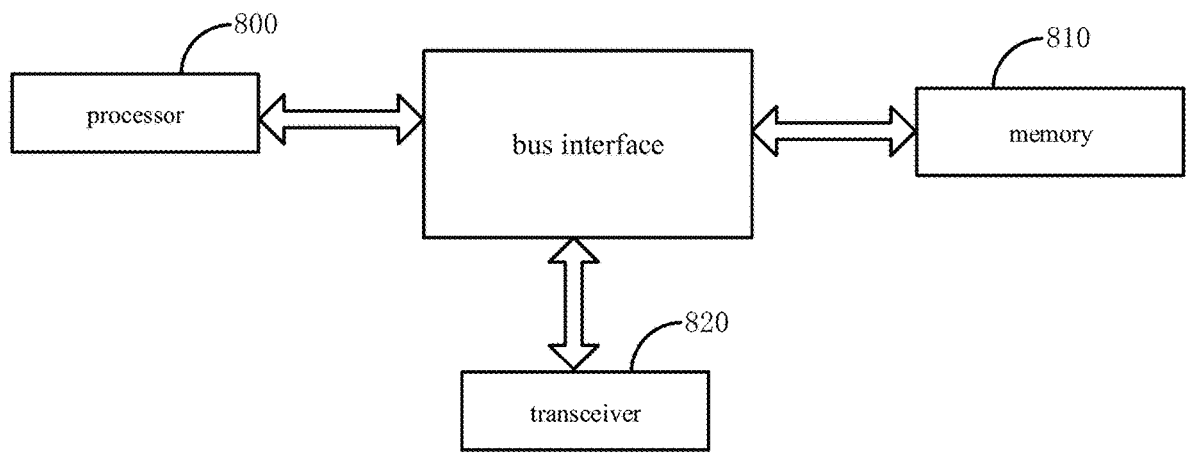
FIG. 8 is a schematic view of a remote terminal according to an embodiment of the present disclosure.

As shown in FIG. 8, an embodiment of the present disclosure further provides a remote terminal, including: a transceiver 820, a memory 810, a processor 800 and a computer program stored on the memory 810 and executable on the processor 800, the transceiver 820 receiving and transmitting data under the control of the processor 800, the processor 800 reading the program in the memory and performing the following operations:

sending a direct communication request message to a relay terminal, where the direct communication request message includes: a flow identification of a first QoS flow requested to be established and a QoS parameter of the first QoS flow; the first QoS flow is a QoS flow on a direct communication interface between the remote terminal and the relay terminal; and receiving a direct communication response message sent by the relay terminal, where the direct communication response message is configured to indicate that an establishment of the first QoS flow is finished.

Optionally, the direct communication request message further includes:

a service information identification supported by the relay terminal.

Optionally, the direct communication response message includes: the service information identification supported by the relay terminal, the QoS parameter of the first QoS flow and the flow identification of the first QoS flow.

Optionally, the processor 800 is configured to read a program in a memory to perform:

communicating with a network through the first QoS flow and the QoS flow established by the relay terminal.

Optionally, the direct communication response message includes: the service information identification supported by the relay terminal, the QoS parameter of the first QoS flow and the flow identification of the first QoS flow.

Optionally, the processor 800 is configured to read a program in a memory to perform:

sending a second registration request message to a network side device, where the second registration request message includes proximity service policy information of the relay terminal that the remote terminal requests the network side device to provide;

receiving a second feedback message sent by the network side device, where the second feedback message includes the proximity service policy information, and the proximity service policy information includes: service information identification supported by the relay terminal.

Optionally, the second registration request message includes remote indication information configured to indicate that a terminal sending the second registration request message is a remote terminal.

The embodiment of the present disclosure further provides a remote terminal, and as the principle of solving the problem of the remote terminal is similar to the processing method of direct communication in the embodiment of the present disclosure, the implementation of the remote terminal may refer to the implementation of the method, and the repeated parts are not described again.

In summary, according to the embodiment of the present disclosure, a first QoS flow on a direct communication interface between the relay terminal and the remote terminal is established, and the remote terminal communicates with a network through the first QoS flow and a QoS flow on a Uu interface of the relay terminal, so that the QoS flow between the relay terminal and the remote terminal is managed, so that the remote terminal can communicate through the PC5 QoS flow and the Uu QoS flow of the relay terminal.

It should be noted that, the remote terminal provided in the embodiments of the present disclosure is a remote terminal capable of executing the processing method for direct communication, and all embodiments of the processing method for direct communication are applicable to the remote terminal and can achieve the same or similar beneficial effects.

It should be noted that, in this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. Without further limitation, an element identified by the phrase "including an . . . " does not exclude the presence of other identical elements in the process, method, article, or apparatus that includes the element.

Through the description of the foregoing embodiments, it is clear to those skilled in the art that the method of the foregoing embodiments may be implemented by software plus a necessary general hardware platform, and certainly may also be implemented by hardware, but in many cases, the former is a better implementation. Based on such understanding, the technical solutions of the present disclosure may be embodied in the form of a software product, which is stored in a storage medium (such as ROM/RAM, magnetic disk, optical disk) and includes several instructions for enabling a terminal (which may be a mobile phone, a computer, a server, an air conditioner, or a network device) to execute the methods according to the embodiments of the present disclosure.

While the embodiments of the present disclosure have been described in connection with the appended drawings, the present disclosure is not limited to the specific embodiments, which have been described above for illustrative purposes only and not for purposes of limitation, and it will be appreciated by those of ordinary skill in the art that, in light of the present disclosure, numerous modifications may be made without departing from the spirit of the disclosure and scope of the appended claims.

While the foregoing is directed to the preferred embodiment of the present disclosure, it will be appreciated by those skilled in the art that various changes and modifications may be made therein without departing from the principles of the disclosure, and it is intended that such changes and modifications be covered by the appended claims.

What is claimed is:

1. A processing method of direct communication, performed by a relay terminal and comprising:
    receiving a direct communication request message sent by a remote terminal, wherein the direct communication request message comprises: a flow identification of a first QoS flow requested to be established and a QoS parameter of the first QoS flow; the first QoS flow is a QoS flow on a direct communication interface between the remote terminal and the relay terminal; and
    sending a direct communication response message to the remote terminal, wherein the direct communication response message is configured to indicate that an establishment of the first QoS flow is finished;
    wherein the direct communication request message further comprises:
    a service information identification supported by the relay terminal;
    wherein prior to the sending the direct communication response message to the remote terminal, the method further comprises:
    in a case that a PDU session corresponding to the service information identification supported by the relay terminal is not established on a Uu interface, establishing the PDU session corresponding to the service information identification supported by the relay terminal on the Uu interface, and establishing a third QoS flow meeting the QoS parameter of the first QoS flow on the established PDU session.

2. The method of claim 1, wherein prior to the sending the direct communication response message to the remote terminal, the method further comprises:
    in a case that a PDU session corresponding to the service information identification supported by the relay terminal is established on a Uu interface, judging whether a QoS flow on the established PDU session corresponding to the service information identification supported by the relay terminal is capable of meeting the QoS parameter of the first QoS flow;
    the sending the direct communication response message to the remote terminal comprises:
    in a case that a second QoS flow capable of meeting the QOS parameter of the first QoS flow exists, sending the direct communication response message to the remote terminal;

in a case that no QoS flow capable of meeting the QoS parameter of the first QoS flow exists, establishing a fourth QoS flow meeting the QoS parameter of the first QoS flow on the Uu interface, and sending the direct communication response message to the remote terminal.

3. The method of claim 2, wherein prior to the sending the direct communication response message to the remote terminal, the method further comprises:
storing a mapping relationship between the flow identification of the first QoS flow and a flow identification of the second QoS flow; or
storing a mapping relationship between the flow identification of the first QoS flow and a flow identification of the fourth QoS flow.

4. The method of claim 3, further comprising:
sending, to the remote terminal, downlink data received from the second QoS flow or the fourth QoS flow on the Uu interface, through the first QoS flow on the direct communication interface according to the mapping relation.

5. The method of claim 1, wherein the judging whether the QoS flow on the established PDU session corresponding to the service information identification supported by the relay terminal is capable of meeting the QoS parameter of the first QoS flow comprises:
judging whether the QoS flow on the established PDU session is capable of meeting the QoS parameter of the first QoS flow, according to a mapping relation between a QoS parameter of the QoS flow on the direct communication interface and a QoS parameter of a QoS flow on the Uu interface configured by a network;
in a case that the QoS parameters of the QoS flows on the established Uu interface comprise a QoS parameter which has a mapping relation with the QoS parameter of the first QoS flow, determining that a second QoS flow capable of meeting the QoS parameter of the first QoS flow exists; otherwise, determined that the second QoS flow does not exist.

6. The method of claim 1, wherein prior to the sending the direct communication response message to the remote terminal, the method further comprises:
storing a mapping relation between the flow identification of the first QoS flow and a flow identification of the third QoS flow.

7. The method of claim 6, further comprising:
sending, to the remote terminal, downlink data received from the third QoS flow on the Uu interface, through the first QoS flow on the direct communication interface according to the mapping relation.

8. The method of claim 1, further comprising:
sending a first registration request message to a network side device, wherein the first registration request message comprises proximity service policy information that the relay terminal requests the network side device to provide;
receiving a first feedback message sent by the network side device, wherein the first feedback message comprises the proximity service policy information, and the proximity service policy information comprises: a mapping relationship between a QoS parameter of the QoS flow on the direct communication interface and a QoS parameter of a QoS flow on a Uu interface.

9. The method of claim 8, wherein the first registration request message further comprises relay indication information, and the relay indication information is configured to indicate that a terminal which sends the first registration request message is a relay terminal.

10. The method of claim 1, wherein the direct communication response message comprises: the service information identification supported by the relay terminal, the QoS parameter of the first QoS flow and the flow identification of the first QoS flow.

11. A processing method of direct communication, performed by a remote terminal and comprising:
sending a direct communication request message to a relay terminal, wherein the direct communication request message comprises: a flow identification of a first QoS flow requested to be established and a QoS parameter of the first QoS flow; the first QoS flow is a QoS flow on a direct communication interface between the remote terminal and the relay terminal; and
receiving a direct communication response message sent by the relay terminal, wherein the direct communication response message is configured to indicate that an establishment of the first QoS flow is finished;
wherein the direct communication request message further comprises:
a service information identification supported by the relay terminal;
wherein the method further comprises:
sending a second registration request message to a network side device, wherein the second registration request message comprises proximity service policy information of the relay terminal that the remote terminal requests the network side device to provide;
receiving a second feedback message sent by the network side device, wherein the second feedback message comprises the proximity service policy information, and the proximity service policy information comprises: service information identification supported by the relay terminal.

12. The method of claim 11, wherein the direct communication response message comprises: the service information identification supported by the relay terminal, the QoS parameter of the first QoS flow and the flow identification of the first QoS flow.

13. The method of claim 11, further comprising:
communicating with a network through the first QoS flow and the QoS flow established by the relay terminal.

14. The method of claim 11, wherein the second registration request message comprises remote indication information configured to indicate that a terminal sending the second registration request message is a remote terminal.

15. A relay terminal, comprising: a transceiver, a memory, a processor, and a computer program stored on the memory and executable on the processor; wherein the transceiver receives and transmits data under control of a processor, the processor is configured to read a program in a memory to perform:
receiving a direct communication request message sent by a remote terminal, wherein the direct communication request message comprises: a flow identification of a first QoS flow requested to be established and a QoS parameter of the first QoS flow; the first QoS flow is a QoS flow on a direct communication interface between the remote terminal and the relay terminal; and
sending a direct communication response message to the remote terminal, wherein the direct communication response message is configured to indicate that an establishment of the first QoS flow is finished;
wherein the direct communication request message further comprises:

a service information identification supported by the relay terminal;

wherein prior to the sending the direct communication response message to the remote terminal, the processor is configured to read the program in the memory to perform:

in a case that a PDU session corresponding to the service information identification supported by the relay terminal is not established on a Uu interface, establishing the PDU session corresponding to the service information identification supported by the relay terminal on the Uu interface, and establishing a third QoS flow meeting the QoS parameter of the first QoS flow on the established PDU session.

16. A remote terminal, comprising: a transceiver, a memory, a processor, and a computer program stored on the memory and executable on the processor; wherein the transceiver receives and transmits data under control of a processor, the processor is configured to read a program in a memory to perform the processing method of direct communication according to claim 11.

* * * * *